United States Patent
Isgreen

(10) Patent No.: US 9,339,727 B2
(45) Date of Patent: May 17, 2016

(54) POSITION-BASED DECISION TO PROVIDE SERVICE

(75) Inventor: Adam Paul Isgreen, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 419 days.

(21) Appl. No.: 13/161,469

(22) Filed: Jun. 15, 2011

(65) Prior Publication Data

US 2012/0322548 A1  Dec. 20, 2012

(51) Int. Cl.
*H04W 4/04* (2009.01)
*H04W 40/20* (2009.01)
*A63F 13/30* (2014.01)

(52) U.S. Cl.
CPC ........... *A63F 13/12* (2013.01); *A63F 2300/406* (2013.01); *A63F 2300/532* (2013.01); *A63F 2300/5573* (2013.01)

(58) Field of Classification Search
CPC ............ A63F 13/12; A63F 2300/5573; A63F 2300/5566; H04W 64/00; H04W 4/02; H04W 29/08657
USPC .......................................................... 463/42
See application file for complete search history.

(56) References Cited

U.S. PATENT DOCUMENTS

| | | |
|---|---|---|
| 7,774,342 B1 | 8/2010 | Virdy |
| 8,019,692 B2 | 9/2011 | Rosen |
| 8,295,465 B2 | 10/2012 | Altberg et al. |
| 2004/0024846 A1 | 2/2004 | Randall et al. |
| 2004/0171379 A1 | 9/2004 | Cabrera et al. |
| 2005/0130728 A1 * | 6/2005 | Nguyen et al. ............ 463/16 |
| 2006/0161599 A1 | 7/2006 | Rosen |

(Continued)

FOREIGN PATENT DOCUMENTS

WO  WO 0186997 A1 * 11/2001 ............. H04M 3/42
WO  WO 2011038760 A1 * 4/2011

OTHER PUBLICATIONS

Treu, et al., "Efficient Proximity Detection for Location Based Services", Retrieved at <<http://www.wpnc.net/fileadmin/WPNC05/Proceedings/Efficient_Proximity_Detection_for_Location_Based_Services.pdf>>, Proceedings of the 2nd Workshop on Positioning, Navigation and Communication, (WPNC) & 1st Ultra-Wideband Expert Talk (UET), 2005, pp. 165-173.

(Continued)

*Primary Examiner* — James S McClellan
*Assistant Examiner* — Syvila Weatherford
(74) *Attorney, Agent, or Firm* — Steven Spellman; Danielle Johnston-Holmes; Micky Minhas

(57) ABSTRACT

A service may be provided to a set of people when the people satisfy a proximity criterion. In one example, that set of people comprises users of a particular application and/or registrants with a particular system. A location monitor may determine people's location based on position data received from those people's devices (which may be obtained pursuant to appropriate permission in order to respect the device owners' interest in privacy). When the location monitor determines, based on people's positions, that a proximity criterion has been satisfied, the location monitor may cause a service to be provided that would not otherwise have been provided if the proximity criterion had not been satisfied. By providing additional service when a proximity criterion is satisfied, a reward in the virtual world is used to encourage people to gather in the physical world.

17 Claims, 6 Drawing Sheets

(56) References Cited

U.S. PATENT DOCUMENTS

| | | |
|---|---|---|
| 2006/0235890 A1 | 10/2006 | Vigil |
| 2007/0185785 A1 | 8/2007 | Carlson et al. |
| 2007/0264969 A1 | 11/2007 | Frank et al. |
| 2008/0005104 A1 | 1/2008 | Flake et al. |
| 2008/0014964 A1 | 1/2008 | Sudit et al. |
| 2008/0031203 A1* | 2/2008 | Bill .............................. 370/338 |
| 2008/0070588 A1 | 3/2008 | Morin |
| 2008/0140650 A1* | 6/2008 | Stackpole ......................... 707/5 |
| 2008/0270224 A1 | 10/2008 | Portman et al. |
| 2009/0061906 A1 | 3/2009 | Malik |
| 2009/0144211 A1* | 6/2009 | O'Sullivan et al. ............. 706/14 |
| 2009/0215469 A1* | 8/2009 | Fisher et al. ............... 455/456.3 |
| 2009/0307105 A1 | 12/2009 | Lemay et al. |
| 2010/0151842 A1 | 6/2010 | De Vries |
| 2010/0161720 A1* | 6/2010 | Colligan et al. ............. 709/203 |
| 2010/0262449 A1 | 10/2010 | Monteforte et al. |
| 2010/0292827 A1 | 11/2010 | Sievenpiper et al. |
| 2010/0302056 A1 | 12/2010 | Dutton et al. |
| 2010/0331016 A1 | 12/2010 | Dutton et al. |
| 2011/0105092 A1* | 5/2011 | Felt et al. .................... 455/414.1 |
| 2011/0307599 A1* | 12/2011 | Saretto et al. ................. 709/224 |
| 2011/0320819 A1* | 12/2011 | Weber et al. .................. 713/176 |
| 2012/0088487 A1 | 4/2012 | Khan |
| 2012/0095979 A1 | 4/2012 | Aftab et al. |
| 2013/0042295 A1 | 2/2013 | Kelly et al. |
| 2013/0045729 A1 | 2/2013 | Haik |

OTHER PUBLICATIONS

"Comprehensive Guide to Location-Based Social Media", Retrieved at <<http://www.thesearchagency.com/whitepapers/tsa_whitepaper_location_based_social_media.pdf>>, Jun. 2010, pp. 1-11.

Martin, et al., "A Context-Aware Application based on Ubiquitous Location", Retrieved at <<http://ieeexplore.ieee.org/stamp/stamp.jsp?tp=&arnumber=4641317>>, The Second International Conference on Mobile Ubiquitous Computing, Systems, Services and Technologies, UBICOMM, Sep. 29-Oct. 4, 2008, pp. 83-88.

Xia, et al., "General Platform of Location based Services in Ubiquitous Environment", Retrieved at <<http://ieeexplore.ieee.org/stamp/stamp.jsp?tp=&arnumber=4197370>>, International Conference on Multimedia and Ubiquitous Engineering (MUE'07), Apr. 26-28, 2007, 5 pages.

Sadhukhan, et al., "A Middleware Based Approach to Dynamically Deploy Location Based Services onto Heterogeneous Mobile Devices Using Bluetooth in Indoor Environment", Retrieved at <<http://www.cse.iitb.ac.in/~riju/770009.pdf>>, The 2nd International Conference on Advanced Communication and Networking, ACN, Jun. 23-25, 2010, pp. 1-14.

McGeough, Jim., "Location-Based Services and Topology", Retrieved at <<http://spatialnews.geocomm.com/features/geomode2/>>, GITA Conference, Aug. 29, 2001, 10 pages.

"Social Networking Check-In Services", Retrieved at <<http://socialmediadiyworkshop.com/2010/03/social-networking-check-in-services/>>, Retrieved Date: Jan. 13, 2011, dated 2009-2010, 5 pages.

Davidsson, et al., "Game Design Patterns for Mobile Games", Retrieved at <<http://procyon.lunarpages.com/~gamed3/docs/Game_Design_Patterns_for_Mobile_Games.pdf>>, Project report to Nokia Research Center, 2004, 57 pages.

"Age of Conan", retrieved at << http://conanvault.ign.com/ >>, retrieved date Jan. 13, 2011, dated 1996-2010, 19 pages.

International Search Report from Korean Intellectual Property Office mailed Jan. 30, 2013 in copending application No. PCT/US2012/049676, filed Aug. 5, 2012, pp. 1-10.

Schutzer, Dan, "Location-based Service", Retrieved at <<http://www.bits.org/downloads/Publicatione%20Page/CTOCornerAugust2010.pdf>>, Aug. 2010.

Schilit, et al., "Customizing Mobile Applications", Retrieved at <<http://citeseerx.ist.psu.edu/viewdoc/download?doi=1 0.1.1.31.2550&rep=rep1 &type=pdf>> In Proceedings of the USENIX Symposium on Mobile & Location-Independent Computing, 1993.

"Market Filters", Retrieved at <<http://developer.android.com/guide/appendixlmarket-filters.html>>, Retrieved Date: Apr. 7, 2011.

"Location-based event system for mobile phones", Retrieved at <<http://janmagneUiles.wordpress.com/2008/01/locationbasedeventsystem.pdf>> Retrieved Date: Apr. 7, 2011.

* cited by examiner

POSITION-BASED DECISION TO PROVIDE SERVICE

BACKGROUND

People are social beings, and they are increasing melding social interactions with computer technology. Social media such as Facebook and Twitter exist specifically to foster social interactions among people. However, even computer activities that were once considered stand-alone activities now tend to have a large-scale social component. In the past, a video game was something that one or two people played on a single device, such as a game console, handheld game player, or cell phone. Games now are often played between many networked participants, some of whom may be quite distant from each other and may not have met in real life.

Social media, online multiplayer games, and other technologies allow a form of social interaction between participants who may be in geographically diverse locations. However, the ability of computers to foster interaction among people who are not near each other has, in many cases, made the geographic proximity seem irrelevant. While it sometimes appears as if a person's virtual existence is so comprehensive as to supplant his or her corporeal existence, there remain situations in which people's physical proximity to each other is relevant.

SUMMARY

An application, or an online provider of service, may leverage information about people's proximity to each other by changing the service that is being provided when a sufficient number of people gather sufficiently close together. In one example, the system may receive data concerning people's location. (In order to preserve users' privacy interests, the system may obtain appropriate permission before gathering information about a person's location.) When a pre-defined number of people have come into sufficiently close proximity to each other, the system may provide a service that would not otherwise be provided. When people disperse, the service may be removed. The act of providing an additional service could take any appropriate form—e.g., delivering an online service or data, or unlocking a feature on a client device that had not previously been usable by the user of that device. In some cases, a progressively larger number of services, or progressively intense versions of the same service, may be provided as a larger number of people gather in a given physical area.

The service that can be provided when people gather could be any appropriate type of service. In one example, the people are paying (or are registered to play) a game on their handheld devices, and—when a sufficient number of people come into proximity—a feature of the game may be unlocked. Examples of such features include a new villain, a new weapon, a temporary condition in which a given set of actions causes more points to be scored, or any other type of feature appropriate to a game. However, the service that may be provided is not limited to gaming scenarios. In another example, detecting a sufficient number of shoppers in a given store might unlock a coupon for an expensive item in that store, in which case the coupon is the service to be provided. The presence of a larger number of shoppers in that store might unlock an additional coupon, or might increase the monetary value of the coupon.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
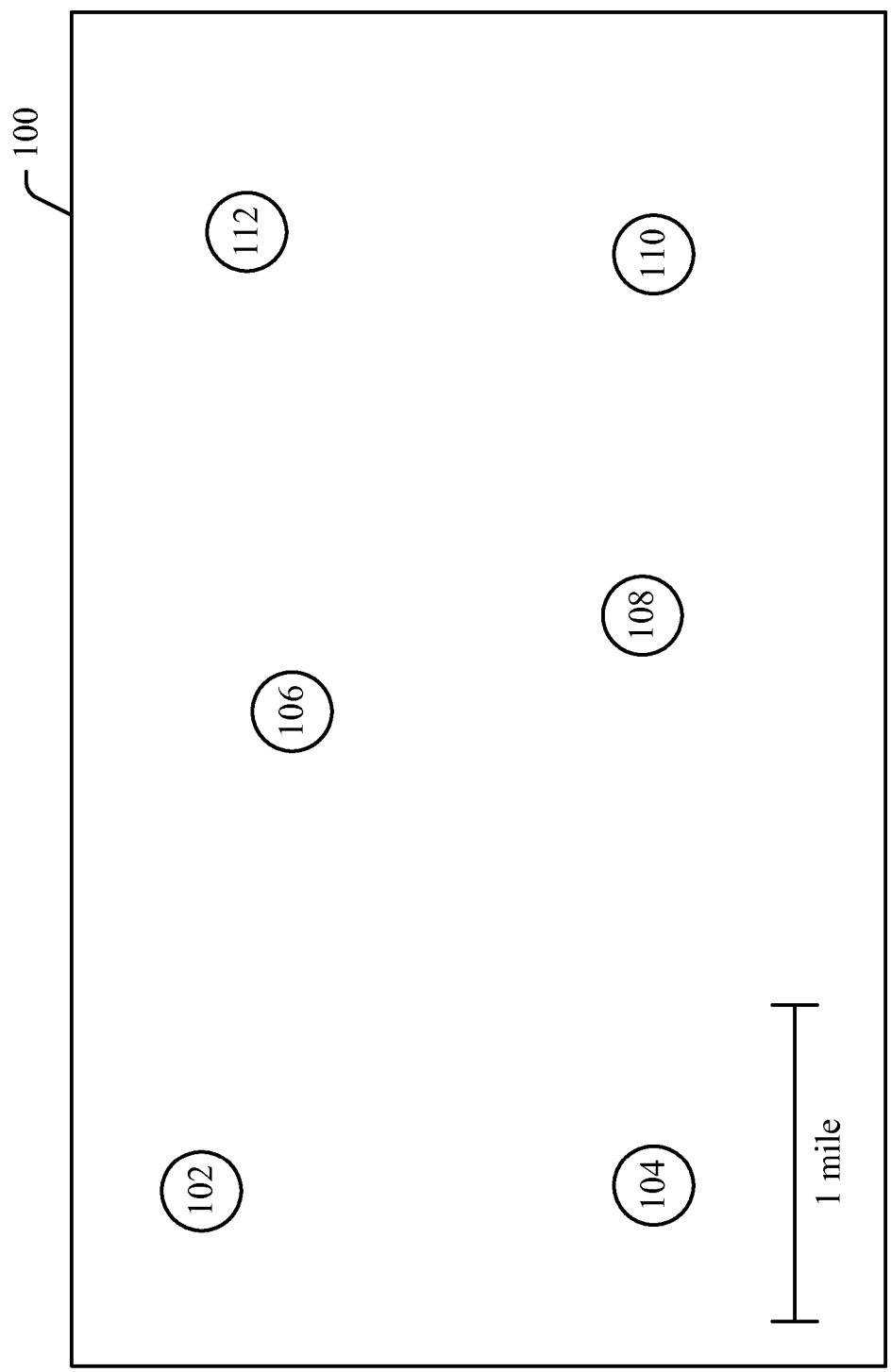
FIGS. 1-3 are a block diagrams of examples in which people are within various levels of proximity to each other.

Many social interactions that, in the past, would have taken place in a face-to-face setting, now take place electronically. People used to meet in person to talk. In some cases they still do, but in many cases conversations have been moved to online media such as Facebook, instant messaging systems, e-mail, etc. Similarly, people used to gather to play games. Prior to electronic games, physical proximity was often a requisite for playing the game (with certain exceptions such as games of correspondence chess). However, even in the case of early video games, multiple players generally gathered around a single game console to play the game. Now, game consoles (and other devices, such as phones, on which people play games) are networked, thereby allowing people who are quite distant from each other to play the game together.

While networking of devices has made physical proximity seem irrelevant in many cases, there still remain situations in which proximity remains relevant. There is something about the synergy of having a several people in one place that cannot be matched by having the same people interact with each other online. It has become common to view the online communication as replacing actual get-togethers. However, systems that facilitate on-line interaction can be used to encourage people to gather together, rather than to replace such gatherings.

The subject matter described herein uses online systems to encourage such gathering. The system provides, in the form of additional services, incentives for people to gather in physical proximity to each other. As people move around, their location may be tracked and reported back to a location monitor. (Since people have a privacy interest in their location, the tracking of people's locations may be done pursuant to appropriate permission obtained from those being tracked. E.g., upon registering for a service, people may be asked if they would like to receive additional service in exchange for providing information about their location, and may be given the chance to opt out of the service.) When the location monitor detects that a sufficient number of people have gathered in sufficient proximity to each other, it may provide a service that would not otherwise be provided. If an even larger number of people gather, then an additional service (or a more intense version of the previously-provided) service may be provided. As people disperse, the service may be scaled back or removed. The people whose proximity is being monitored may be people who have already expressed an interest in the system that is providing the service. E.g., the people may be registered users of an online game, so the provision of an extra game service (such as an additional villain or other type of challenge, an additional weapon or other type of tool, or a change in scoring structure) may be of interest to those people. Thus, the prospect of getting an additional service may be a sufficient incentive to encourage those people to gather in proximity to each other. In this way, the monitoring of locations, combined with the provision of additional services as a reward for proximity, may be a way to encourage those who interact online to gather in real life.

The service that is provided as a reward for proximity may be provided in various ways. In one example, the underlying system that people are using to interact with each other is a "software as a service" type of system, which may be delivered as a cloud service. In this case, the software that the users are experiencing is executed at a central application server, in which case the server can simply "turn on" that feature and start delivering it to the participants by allowing participants to interact with the service over a network. In another example, participants execute client side software. In this case, the additional service can be provided as an extension module that is delivered to, and installed on, the client when a sufficient number of proximal participants trigger the service. Or, the service might already be available on the client side software in a locked form, in which case the provision of an extra service might be performed by delivering an unlock code or unlock instruction to the client. Any appropriate mechanism could be used to deliver an additional service. Removing the service upon dispersal of the participants could be performed by ceasing to execute the service at the central server (in the case of a cloud service), or instructing the clients to "re-lock" or discontinue use of the service (in the case where the service is executed by client-side software).

There are various types of services that could be provided. The particular type of service may depend on the context in which the users are interacting. The following are some example scenarios, although it will be understood that a service to be provided as a reward for proximity could be provided in any appropriate context.

In one example, users are registered participants of an online game, and they interact with each other in the gaming world. The game might involve scoring points by slaying real and/or fictional villains with real and/or fictional weapons. In such a context, an additional service might involve providing an additional villain to slay, or an additional type of weapon with which to slay the villain, an increase in the damage inflicted by an existing weapon, or an increase in the number of points to be obtained by making certain types of hits on the villain. Thus, if several players gather within one square mile of each other, the new villain might be made available to only those players. Those players then interact with each other to slay this particular villain, thereby having—by virtue of their physical proximity to each other—a different playing experience from the thousands of other players who do not happen to be in that square mile. If more players come within the same area as the players who are experiencing the additional service, the service might be intensified—e.g., the villain might become stronger or harder to defeat, thereby making play more interesting for the players involved. In other words, the players receive a more interesting playing experience because of their proximity to each other, and thus have an incentive to encourage like-minded game players to gather in real life.

While gaming is one example in which a service could be provided as a reward for proximity, it is not the only example. In another example, the service to be provided might be commercial in nature. For example, viewers of a cooking television show might download the show's application onto their smart phones. The show might feature a recipe with a pricey ingredient. If a sufficient number of viewers of the show are together in a store at one time (where viewers might be identified as being those people who have installed the show's application on their phone), then a coupon for a discount on that ingredient might be delivered to their phone. (Or, in another variation, the participants might be sent a message telling them to gather at a particular place in the store to pick up a paper coupon, thereby encouraging fans of the cooking show to meet each other in person.) Having a larger number of people gather in the store might cause the monetary value of the coupon to increase, which is an example of intensifying the service. The prospect of getting a coupon based on the number of fans of the cooking show who are in the store (or the prospect of increasing the value of an existing coupon) may cause people to contact their friends and encourage them to come to the store. Encouraging people to come to the store not only fosters face-to-face interaction between like-minded fans of the cooking show, but also increases the store's business by bringing more people to the store.

The foregoing are some examples of how online interaction may be used to encourage people to gather in person. However, the subject matter herein is not limited to these specific scenarios, and may cover any appropriate scenario.

Figure 2:
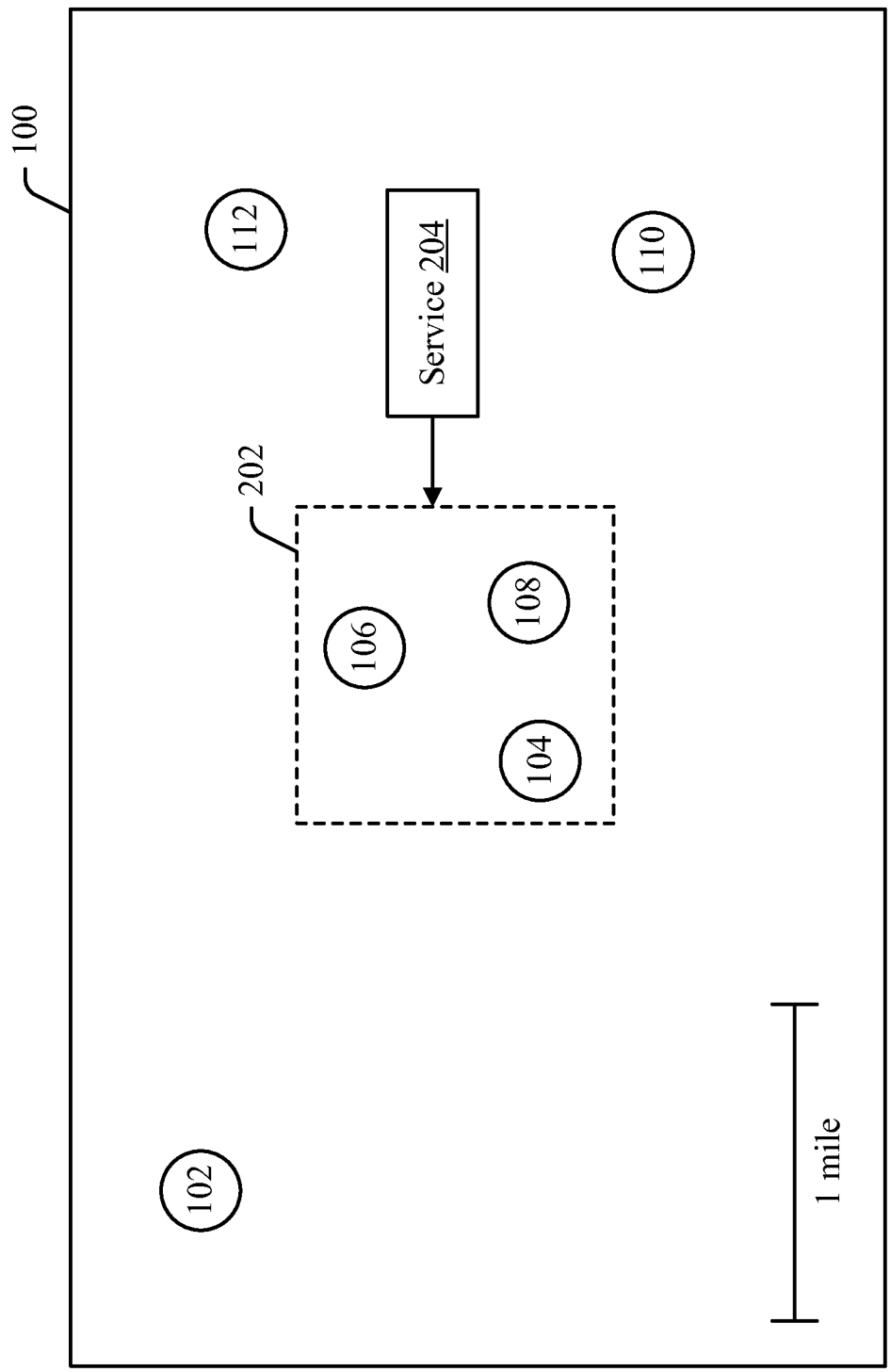
Figure 3:
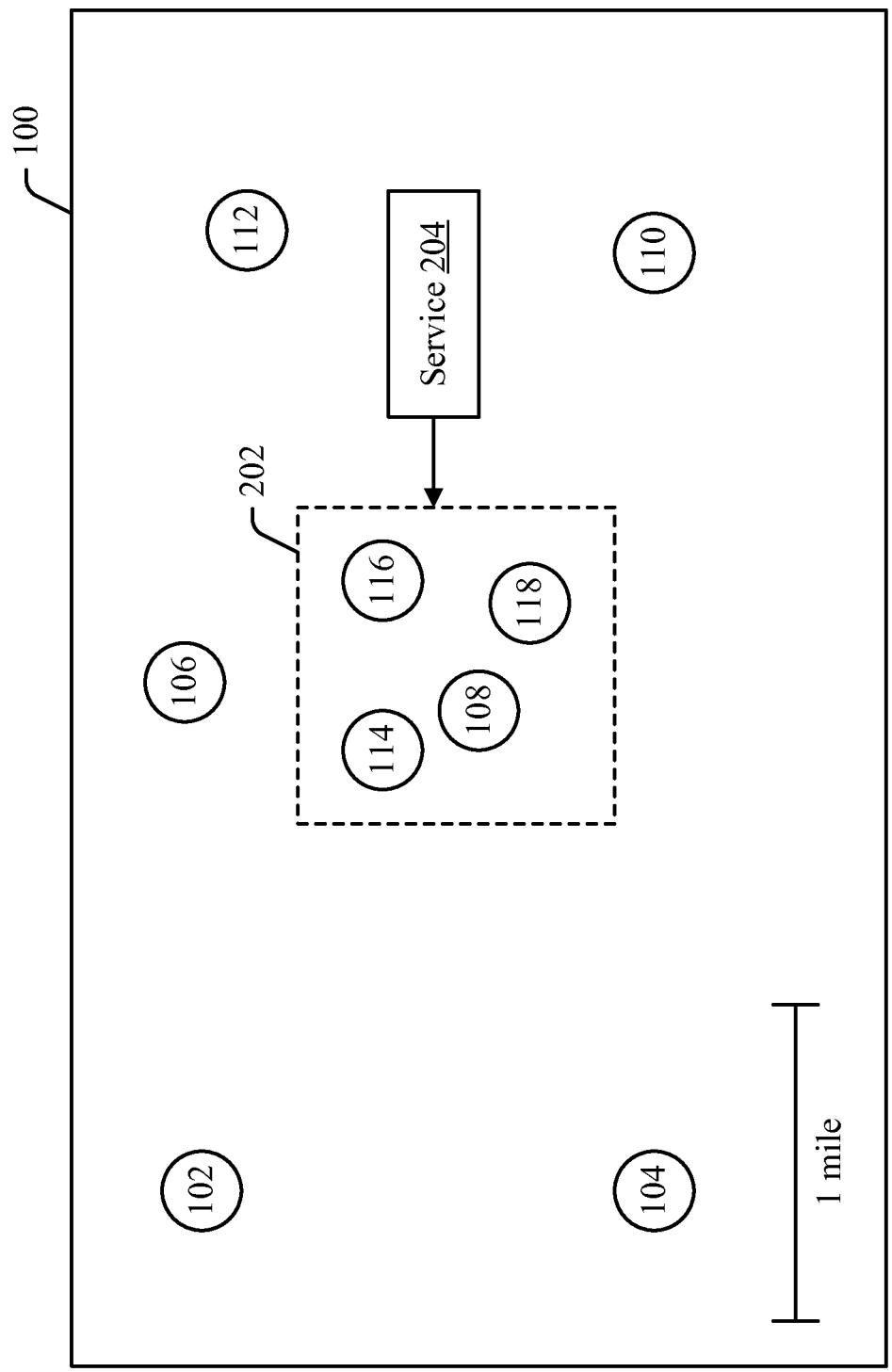

Turning now to the drawings, FIGS. 1-3 show examples in which people are in various levels of proximity to each other. FIG. 1 shows a geographic area 100. There may be several people in geographic area 100. For example, FIG. 1 shows people 102, 104, 106, 108, 110, and 112. There may be people in geographic area 100 other than the six people 102-112 who are shown. However, for the purpose of deciding whether to provide a service as a reward for proximity, the people who are considered are those who are users of a particular application and/or registrants with a particular system. For example, people 102-112 might be registered players of an online game, or people who have installed the cooking show's smart phone app as described above. Although the notion of a "geographic area" is not limited to any particular size or scale, for the purpose of illustration FIG. 1 shows a one mile scale marker, thereby indicating how far apart the people in FIG. 1 are from each other.

In the example in FIG. 1, people 102-112 are considered to be sufficiently distant from each other that no additional service is offered to them. Of course, these people might receive the ordinary level of service for which they are registered—e.g., if they are registered to play a game, then they may still receive the service of being able to play the game. However, the game might not offer them an additional service, such as an additional villain (or other type of challenge) or weapon (or other type of tool) or increase in score (or other change in the scoring structure), because the people are not sufficiently proximate to one another.

FIG. 2 shows the same set of people 102-112 in the same geographic area 100 as are shown in FIG. 1. However, in FIG. 2 people 102-112 have moved, thereby bringing some of them into sufficient proximity to each other. In FIG. 2, people 104, 106, and 108 have moved into a one-square-mile contiguous region 202 of geographic area 100, thereby triggering the provision of service 204. Since it is the proximity of people 104, 106, and 108 who have triggered the provision of service 204, people 104-108 may be the sole recipients of service 204. However, in another example, service 204 could also be provided to people other than people 104-108. For example, person 102 (who is not in region 202) might receive service 204 as a way of promoting the idea of proximity rewards to that person. (E.g., person 102 might be a person who has not experienced proximity-based rewards before, so service 204 might be provided to person 102 as a way of advising person 102 of the type of services he could receive in the future by gathering with other people.)

FIG. 2 shows an example in which a service is triggered when people whose location was being tracked, but who previously were not close enough to each other move closer to each other. However, a service could also be triggered by the addition of new people. For example, FIG. 3 shows the same geographic area 100 that is shown in FIGS. 1 and 2. However, in addition to showing people 102-112, FIG. 3 also shows people 114, 116, and 118. People 114-118 may have wandered into geographic area 100, or may be people who were already in geographic area 100 but who have just installed the same application that people 102-112 are using (thereby newly allowing those people to be counted for the purpose of triggering proximity-based services), or who have just registered with the system with which people 102-112 are registered. As shown in FIG. 3, people 104 and 106 have wandered outside of region 202, but people 114-118 are now within region 202. Thus, in FIG. 3, people 104 and 106 no longer receive service 204, but people 114-118 do receive service 204 (and person 108, who remains within region 202, continues to receive service 204).

Triggering the provision of a service involves a minimum number of people being within sufficient proximity to each other. In the example of FIGS. 1-3, "sufficiently proximate" is being within the same one-square-mile area, and "sufficient number of people" is three people within that area. Thus, in the example of FIGS. 1-3, service 204 is provided as long as at least three people are in region 202 (or in a similarity sized region somewhere else in geographic area 100). However, the notion of "sufficiently proximate," or the notion of what constitutes a "sufficient number of people," could be defined in any appropriate manner. Moreover, it is noted that the example of FIGS. 1-3 are not limited to any particular type of service; the service 204 to be provided could be any type of service, such as a new villain, weapon, or scoring system for a game (as described above), a new coupon for a cooking ingredient (as also described above), or any other type of service.

Figure 4:
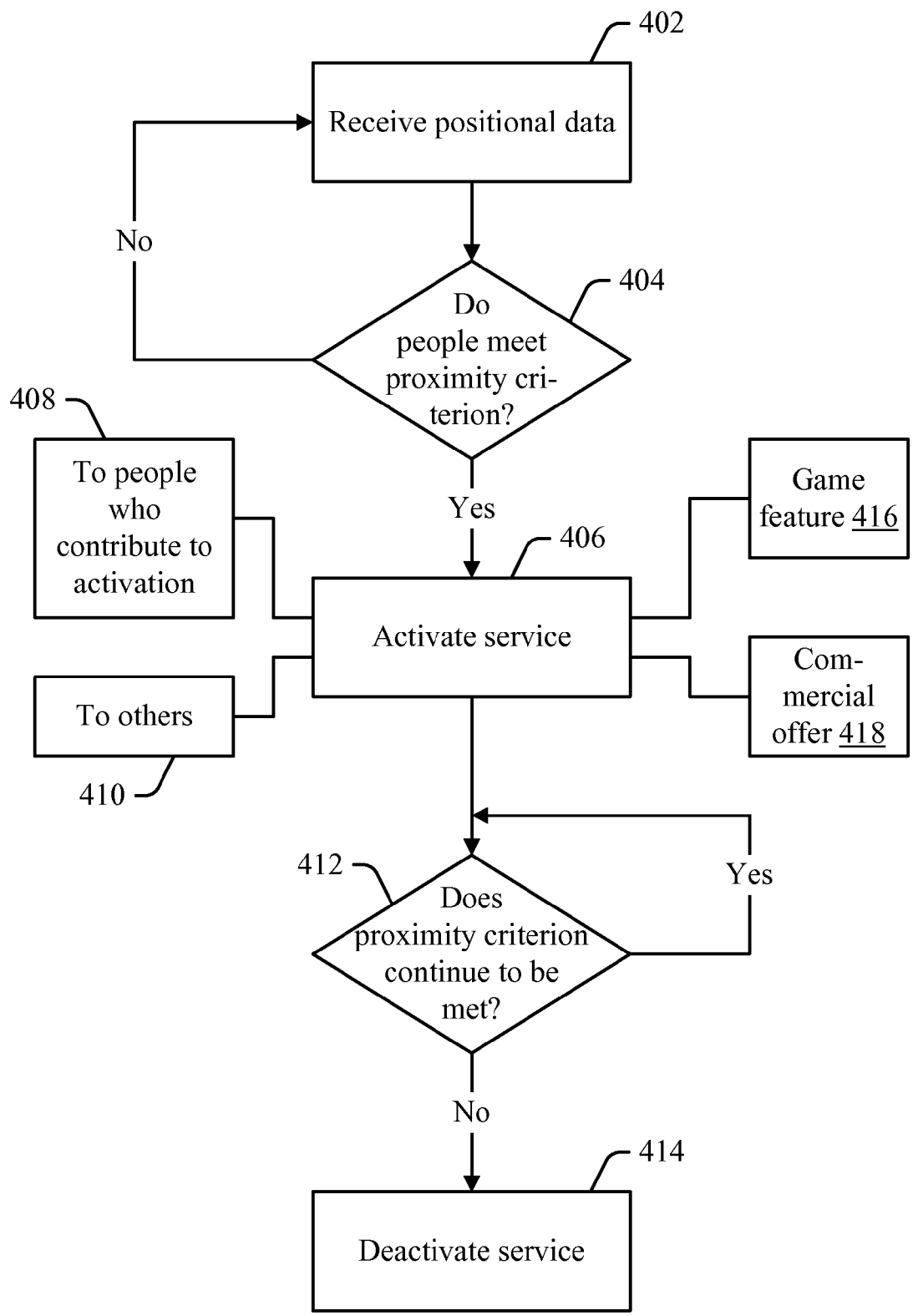
FIG. 4 is a flow diagram of an example process of providing a service based on a set of people's proximity to one another.

FIG. 4 shows an example process of providing a service based on a set of people's proximity to one another. Before turning to a description of FIG. 4, it is noted that the flow diagram contained in FIG. 4 is described, by way of example, with reference to items shown in FIGS. 1-3, although these processes may be carried out in any system and are not limited to the scenarios shown in FIGS. 1-3. Additionally, the flow diagram in FIG. 4 shows an example in which stages of a process are carried out in a particular order, as indicated by the lines connecting the blocks, but the various stages shown in FIG. 4 can be performed in any order, or in any combination or sub-combination.

At 402, positional data is received. For example, devices carried by people may self-report their location to a position monitor, where the device determines its location through the Global Positioning System (GPS), triangulation, or some other mechanism or technique. (In order to preserve the expectation of privacy of the people who hold the devices, transmission of position information may be done pursuant to appropriate permission and consent obtained from the person who carries the device.) The position data may indicate where the device that is transmitting the position data is physically located.

Based on the positional data that has been received, it is determined at 404 whether there are people who meet an applicable proximity criterion. As discussed above, a proximity criterion generally has two components: the size of a geographic area in which multiple people could appear, and the number of people who would have to appear in that area in order to trigger the provision of a service. Thus, an example proximity criterion might say that a new service is triggered if at least three people appear in the same one-square-mile region. If the proximity criterion is not met, then the process returns to 402 to continue to receive positional data.

If the proximity criterion is met, then activation of the new service has been triggered, so the process continues to 406 to activate that service. Examples of services that may be activated are a game feature 416 (e.g., a new villain), or a commercial offer 418 (e.g., a coupon), as described above. As noted above, there are two groups of people for whom a service can be activated: people who "contribute" to activation (block 408), and other people (block 410). People who "contribute" to activation are those whose proximity to each other satisfies the proximity portion of the triggering criterion. For example, if three people all move into the same one-square-mile region, then those three people have "contributed" to activation. If a fourth person (or fifth person, or sixth person, etc.) also moves into that one-square-mile region, then that person (those people) will also be considered to have "contributed" to activation. (If the criterion for activation is that three people be in the same one-square-mile region, then technically activation can occur without the fourth person. However, when that person moves into the region, he meets the geographic portion of the proximity criterion, and is thus considered to be a contributor.) "Other" people are those who do not meet the proximity criterion. As noted above, although the subject matter herein may be used to encourage physically proximate gathering of people, a system might want to deliver a service to a person who does not meet the proximity criterion as a way of promoting proximity-driven services to people who might not be aware of them.

After the service has been activated, at 412 it is determined whether the proximity criterion continues to be met. If the proximity criterion continues to be met, then the process returns to 412 to determine, continually, whether the proximity criterion is being met. When it is determined that the proximity criterion is no longer being met (e.g., if there are no longer three people in the same one-square-mile region), then the service that was provided at 406 is deactivated (at 414), and ceases to be provided.

Figure 5:
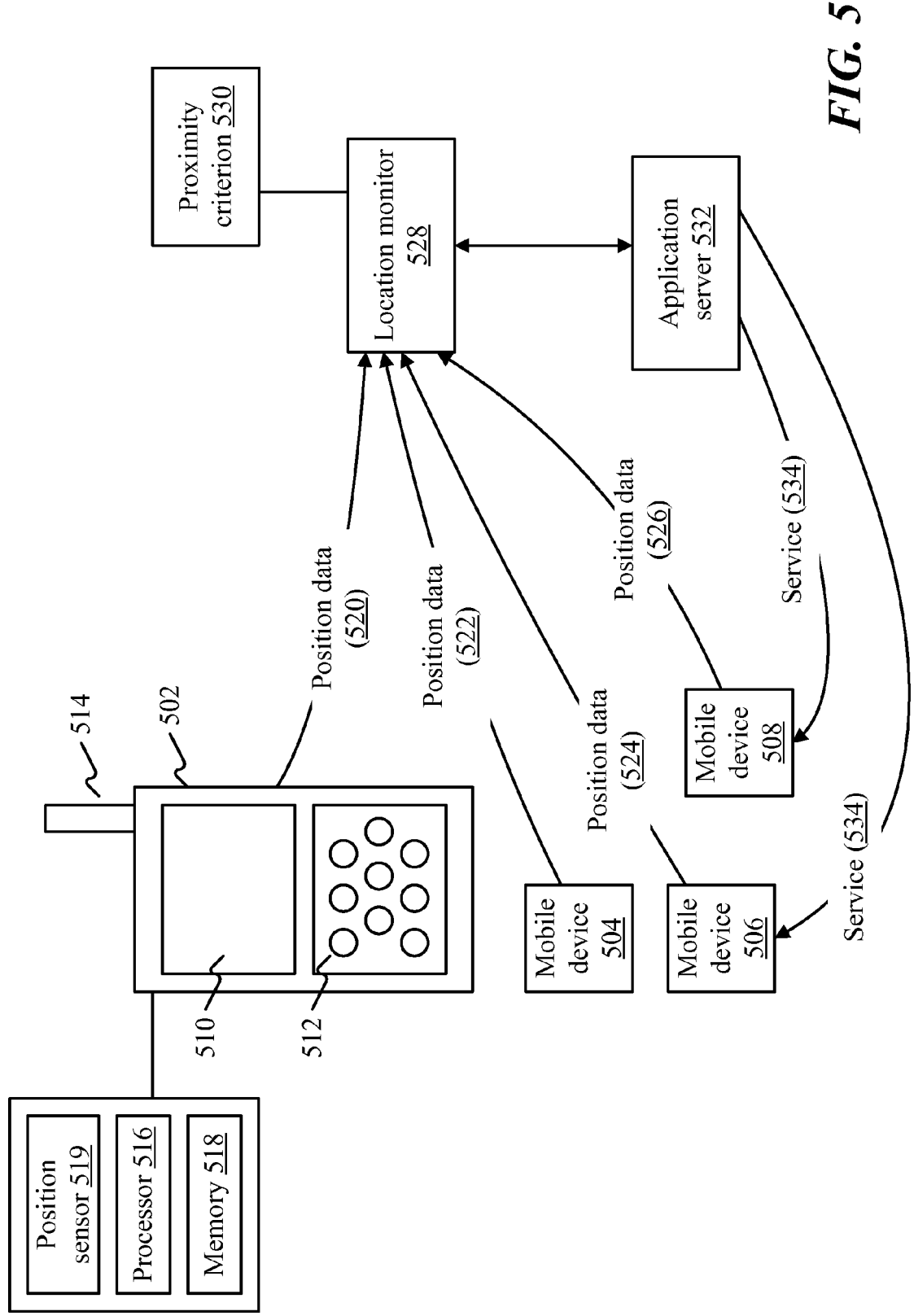
FIG. 5 is a block diagram of an example system in which proximity-based services may be provided.

FIG. 5 shows an example system in which proximity-based services may be provided. A plurality of mobile devices 502, 504, 506, and 508 may be carried by people. Some example detail of one of the mobile devices (device 502) is shown. Example device 502 may be a wireless telephone having a display 510, a keypad 512, an antenna 514 (through which information may be transmitted and received), a microphone to receive audio input, a speaker to provide audio output, a position sensor 519 such as a GPS receiver, and any other type of components appropriate for such a device. Device 502 may also have a processor 516 and a memory 518, in order to allow device 502 to store and execute software. For example, device 502 may store and execute an application program, and that application program may have one or more features that can be locked and/or unlocked. While FIG. 5 shows detail only for device 502, devices 504-508 may have the same or similar features to those shown and/or mentioned above for device 502.

Devices 502-508 may use their respective position sensors to determine their location, and may each transmit position data indicative of their respective positions back to a location monitor 528. In particular, devices 502, 504, 506, and 508 transmit position data 520, 522, 524, and 526, respectively, to location monitor 528. Location monitor determines whether a proximity criterion 530 has been met with respect to any of the devices whose position is being monitored. If such a proximity criterion 530 has been met, then location monitor 528 communicates with an application server 532 to provide an indication that the proximity criterion has been met, and to indicate which devices contribute to meeting the proximity criterion. Application server 532 may then provide, to those devices that contribute to meeting the proximity criterion 530, a service 534 that would not otherwise have been provided if the proximity criterion 530 has not been met. For example, the proximity criterion might be that two devices are within some distance of each other (e.g., 500 feet). Thus, in the example of FIG. 5, application server 532 provides service 534 to devices 506 and 508, since those devices contribute to meeting proximity criterion 530. Service 534 may be provided in various forms. For example, if service 534 is part of an on-line "cloud-based" application, then application server 532 may provide service 534 by executing a program to provide that service on application server 532, and by allowing those devices on which the service is to be provided to interact with that program. In another example, service 534 may exist as a locked feature in an application that is stored on devices 502-508, in which case providing service 534 may be performed by providing an unlock code or unlock instruction to those devices on which service 534 is to be provided.

Figure 6:
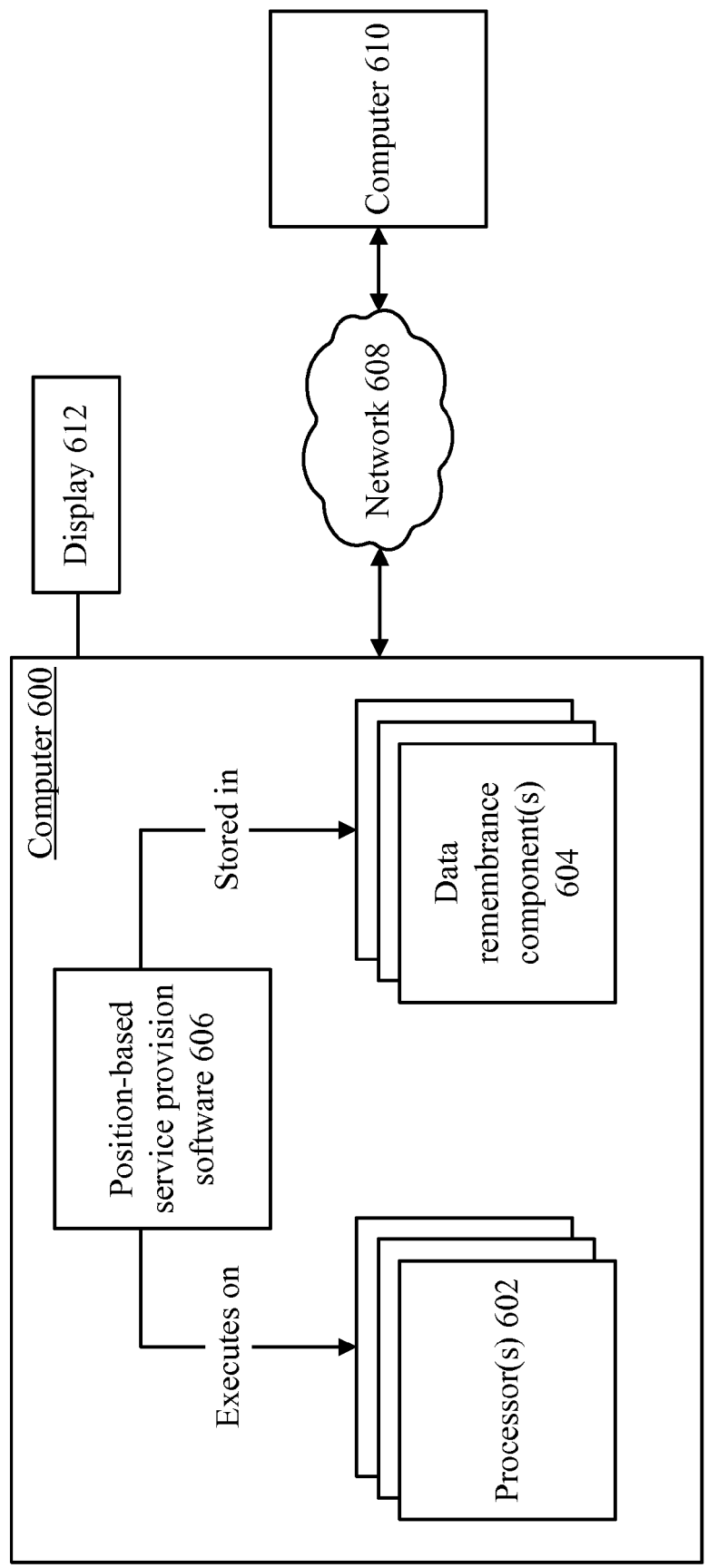
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is position-based service provision software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media, or on one or more computer-readable storage memories. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device for selectively deciding to provide a service, the device comprising:
one or more processors; and
a processor-readable storage device, that stores executable instructions to provide a service, the executable instructions, when executed by the one or more processors, causing the one or more processors to perform acts comprising:
receiving position data from a plurality of devices, said position data indicating where said plurality of devices are physically located;
first determining that a set of said plurality of devices satisfies a proximity criterion, which is a threshold local density amongst said devices in a contiguous region;
based on said first determining, providing said service to users of devices in said set and to at least some of the users of devices that are not in said set, said service not being provided when said proximity criterion is not met;
during the providing, second determining that an additional one of the plurality of devices satisfies the proximity criterion;
after said second determining, intensifying said service;
after said providing, third determining that said proximity criterion is no longer being met;
based on said third determining, ceasing to provide said service; and
said users being people who have registered to play an on-line game, and said service being a challenge, a tool, or a scoring structure that is not used by said on-line game when said proximity criterion is not being met.

2. The device of claim 1, said proximity criterion comprising a minimum number of said plurality of devices being within a distance of each other, or within an area of a particular size.

3. The device of claim 1, said service being a cloud service that executes on an application server, said act of providing said service comprising allowing said users of devices in said set to interact with said service on said cloud server.

4. The device of claim 1, said service being a client-side service that exists on said devices in a locked form, said act of providing said service comprising providing, to devices in said set, an unlock code or unlock instruction to unlock said service.

5. The device of claim 1, said users being people who have downloaded a particular application.

6. The device of claim 1, said service being part of a cloud service, said users being people who have registered to use said cloud service.

7. A method of providing a service, the method comprising: using a processor to perform acts comprising:
receiving position data from a plurality of devices, said position data indicating physical locations of said plurality of devices;
determining that a set of said plurality of devices satisfies a proximity criterion, said proximity criterion being based on a minimum number of devices in said set being within a physical distance of each other,
based on said determining, providing said service to users of at least some of the plurality of devices, including those in said set and at least one user not in said set, said service not being provided to said users when said proximity criterion is not met;
during the providing, amplifying the service when an additional one of the plurality of devices is determined to satisfy the proximity criterion; and
said users being people who have registered to play an on-line game, and said service being a challenge, a tool, or a scoring structure that is not used by said on-line game when said proximity criterion is not being met.

8. The method of claim 7, said service being a cloud service that is implemented on an application server, said providing of said service comprising allowing said users of devices in said set to interact with said service on said application server.

9. The method of claim 7, said service being a client-side service that exists on said devices in a locked form, said act of providing said service comprising providing, to devices in said set, an unlock code or unlock instruction to unlock said service.

10. The method of claim 7, said determining that said set of devices satisfies said proximity criterion considering only devices on which a particular application has been installed.

11. The method of claim 7, said service being part of a cloud service, said determining that said set of devices satisfies said proximity criterion considering only devices of users who have registered to use said cloud service.

12. A device for participating in receiving a service, the device comprising:
a memory;
a processor;
an antenna through which said device receives and transmits information;
a position sensor; and
software that is stored in said memory and that executes on said processor, said software causing said device to transmit said device's position, as reported by said position sensor, to a location monitor that receives position data from a plurality of devices, including said device, said location monitor determining whether to provide said service to a user of said device based on whether a set of said plurality of devices meet a proximity criterion, said location monitor causing said service to be provided to said user and to other users of other devices when said proximity criterion is met, said location monitor causing said service to cease to be provided to said user when said proximity criterion ceases to be met,
wherein, during the providing, the provided service is intensified when an additional one of the plurality of devices is determined to satisfy the proximity criterion,
wherein said proximity criterion comprising a minimum number of devices being within a distance of each other, or within an area of a particular size; and
said location monitor, in determining whether said proximity criterion has been met, considering those devices that are registered to play an on-line game, said service being a challenge, a tool, or a scoring structure that is not used by said on-line game when said proximity criterion is not being met.

13. The device of claim 12, said service being a cloud service that executes on an application server, application service providing said service to said user by allowing said device to interact with said service on said cloud server.

14. The device of claim 12, said service being a client-side service that exists on said device in a locked form, said location monitor causing said service to be provided to said device by causing an unlock code or unlock instruction that unlocks said service to be sent to said device.

15. The device of claim 12, said location monitor, in determining whether said proximity criterion has been met, considering those device on which a particular application has been installed.

16. The device of claim 12, said service being part of a cloud service, said location monitor, in determining whether said proximity criterion has been met, considering those device whose users have registered to use said cloud service.

17. The device of claim 1, wherein said service is an additional service that supplements a service already provided to said devices, and
wherein, in said providing, said additional service is provided to each of said devices that caused said proximity criterion to be satisfied even when a device leaves the contiguous region so long as said proximity criterion is still being met.

* * * * *